(12) United States Patent
Torchio et al.

(10) Patent No.: US 12,368,304 B2
(45) Date of Patent: Jul. 22, 2025

(54) POWER MANAGEMENT OF RESOURCES

(71) Applicant: Collins Aerospace Ireland, Limited, Cork (IE)

(72) Inventors: Marcello Torchio, Cork (IE); Alessandro Razzoli, Licciana Nardi (IT)

(73) Assignee: COLLINS AEROSPACE IRELAND, LIMITED, Cork (IE)

( * ) Notice: Subject to any disclaimer, the term of this patent is extended or adjusted under 35 U.S.C. 154(b) by 0 days.

(21) Appl. No.: 18/536,896

(22) Filed: Dec. 12, 2023

(65) Prior Publication Data

US 2024/0195181 A1    Jun. 13, 2024

(30) Foreign Application Priority Data

Dec. 13, 2022  (EP) ..................................... 22213254

(51) Int. Cl.
*H02J 3/46* (2006.01)
*B64D 27/357* (2024.01)
(Continued)

(52) U.S. Cl.
CPC .............. *H02J 3/46* (2013.01); *B64D 27/357* (2024.01); *B64D 27/359* (2024.01);
(Continued)

(58) Field of Classification Search
CPC .. H02J 3/46; H02J 3/322; H02J 3/0012; H02J 2310/44; B64D 27/359; B64D 27/357; B64D 2221/00
See application file for complete search history.

(56) References Cited

U.S. PATENT DOCUMENTS 7,805,204 B2 *  9/2010  Ghanekar ................. H02J 4/00
                                                          700/286
8,396,612 B2 *  3/2013  Fernandez-Ramos .....................
                                                      H04L 12/40032
                                                              701/3
(Continued)

FOREIGN PATENT DOCUMENTS

CN        105515190 A      4/2016
EP        4087079 A1      11/2022

OTHER PUBLICATIONS

Abstract for CN105515190 (A), Published: Apr. 20, 2016, 1 page.
European Search Report for Application No. 22213254.0, mailed May 12, 2023, 8 pages.

*Primary Examiner* — Carlos Amaya
(74) *Attorney, Agent, or Firm* — CANTOR COLBURN LLP

(57) ABSTRACT

A power and energy management (PEM) method for managing power consumed by a plurality of power devices on a network. The method includes: a monitoring step (S1) to determine whether PEM is required based on the power available on the network and the power consumption of the power devices on the network; a monitor step (S2) to determine the operating status of each of the power devices on the network; a step (S4) of determining a strategy for operating the power devices in response to a determination in the monitoring step that PEM is required; a step (S5) of determining a coordination strategy for recharging of any storage devices on the network in response to a determination in the first network monitoring step that PEM is not required; and controlling (S6) devices on the network to operate at a power consumption level and/or to recharge based on the above steps.

13 Claims, 2 Drawing Sheets

(51) Int. Cl.
*B64D 27/359* (2024.01)
*H02J 3/00* (2006.01)
*H02J 3/32* (2006.01)

(52) U.S. Cl.
CPC ............ *H02J 3/0012* (2020.01); *H02J 3/322* (2020.01); *B64D 2221/00* (2013.01); *H02J 2310/44* (2020.01)

(56) References Cited

U.S. PATENT DOCUMENTS

| | | | |
|---|---|---|---|
| 8,548,713 | B2 | 10/2013 | Self et al. |
| 8,970,160 | B2 | 3/2015 | Groves et al. |
| 10,338,540 | B2 | 7/2019 | Mercier-Calvairac et al. |
| 2017/0358929 | A1* | 12/2017 | Koeppe ................... H02J 1/08 |
| 2022/0153425 | A1 | 5/2022 | Carre et al. |
| 2022/0399590 | A1 | 12/2022 | Lagarde et al. |

* cited by examiner

POWER MANAGEMENT OF RESOURCES

CROSS REFERENCE TO RELATED APPLICATIONS

This application claims priority to European Patent Application No. 22213254.0 filed Dec. 13, 2022, the entire contents of which is incorporated herein by reference.

TECHNICAL FIELD

The present disclosure is concerned with the management of power or energy between a number of power resources e.g. a number of power devices on an aircraft.

BACKGROUND

There are many fields in which a number of electrical or power devices are powered by a power grid or common supply and in some circumstances the amount of power/energy consumed by individual devices needs to be adjusted or managed to deal with varying demands on the grid/supply. In the following, power is specifically stated, but it should be noted that this term can be used interchangeably with energy. In cases of overload, or power failure, for example, the amount of electricity consumed by some or all of the loads may need to be reduced. At low demand times, on the other hand, generators may operate to return power to the system. Systems, known as Power and Energy Management Systems (PEMSs) are known to appropriately allocate available power between devices. One field where power and energy management is becoming increasingly important is in the aircraft industry. The industry is moving towards More Electric (or All Electric) Aircraft (MEA/AEA) to reduce the reliance on large, heavy mechanical and hydraulic system, this leading to an overall reduction in fuel consumption by aircraft. More and more aircraft systems and devices on-board aircraft are driven by electric power. Typically, an aircraft will have a large number of diverse power devices such as coffee machines, ovens, lighting, entertainment systems, announcement systems, as well as power devices used in the cockpit for flight control. With advances in MEA/AEA, batteries or fuel cells etc. may be provided to power the aircraft engines, and other systems that use fuel and/or mechanical or hydraulic control, such as environmental control systems, actuators for brakes, flight control systems, etc. may also be electrically powered. Some of these devices are safety critical devices, and others are less so. Many of the devices are so-called 'flexible' power devices in that they can modify their power consumption (e.g. between on and off or consuming different amounts of power) in response to a request from an external device or system such as a PEMS. The flexibility in power consumption can be used to advantage in the case that the demands on the grid/power supply fluctuate. The PEMS can then ensure, for example, that in the case of overload of the grid or generator failure, power continues to be supplied to the most safety critical devices whilst power supply to other devices can be reduced according to the devices in question.

PEMSs may be deployed as centralised components or as distributed architectures, and will interact with the on-board flexible power devices. PEMSs generally operate with the aim of enforcing a general objective at the power grid level—e.g. to maintain the overall power consumption at the aircraft level within specific bounds to avoid the emergence of critical operating conditions.

With advances in the field of MEA/AEE, aircraft are now also being provided with energy generating and storage devices such as batteries, supercapacitors etc. PMESs are being designed to also drive such resources that can both provide power to drive loads and yield power to the grid, and actively monitor their status (e.g. state of charge, optimisation of charging cycles, etc.).

As networks in many fields, including on aircraft, are being designed to power a large a varied number of heterogenous power devices and generative and storage devices, and that such networks will vary according to applications and uses, there is a need for a PEMS that operates according to a generic protocol regardless of the application and the design of the network and the power devices on the network.

SUMMARY

According to the present disclosure, there is provided a power and energy management, PEM, method for managing power consumed by a plurality of power devices on a network, the scheme comprising: a first network monitoring step to determine whether power and energy management is required based on the power available on the network and the power consumption of the power devices on the network; a status monitor step to determine the operating status of each of the power devices on the network; a step of determining a coordination strategy for operating the power devices on the network in response to a determination in the first network monitoring step that power energy management is required; a step of determining a coordination strategy for recharging of any storage devices on the network in response to a determination in the first network monitoring step that power energy management is not required; and controlling devices on the network to operate at a power consumption level and/or to recharge based on the above steps.

The plurality of devices may comprise one or more groups of power devices.

The first network monitoring step may determine whether power and energy management is required based on detection of e.g. an overcharge condition on the network or a failure condition on the network.

The status monitoring step may obtain status information indicative of whether a power device is faulty or not available.

The PEM method may be used e.g. for managing power consumed by a plurality of power devices on a network in an aircraft.

Also provided is a PEM system for performing the above method, the system comprising: a global supervisor; a plurality of local supervisors each connected for digital communication with one or more of the plurality of power devices, the local supervisors connected for communication with the global supervisor.

The plurality of power devices may be power devices on an aircraft.

BRIEF DESCRIPTION OF THE FIGURES

Examples according to the disclosure will now be described with reference to the drawings. It should be noted that these are examples only and variations may be possible within the scope of the claims. Specific examples will be described in relation to a power network on an aircraft but this is only one example, and the principles of the disclosure may also be used in other fields or environments.

DETAILED DESCRIPTION

Figure 1:
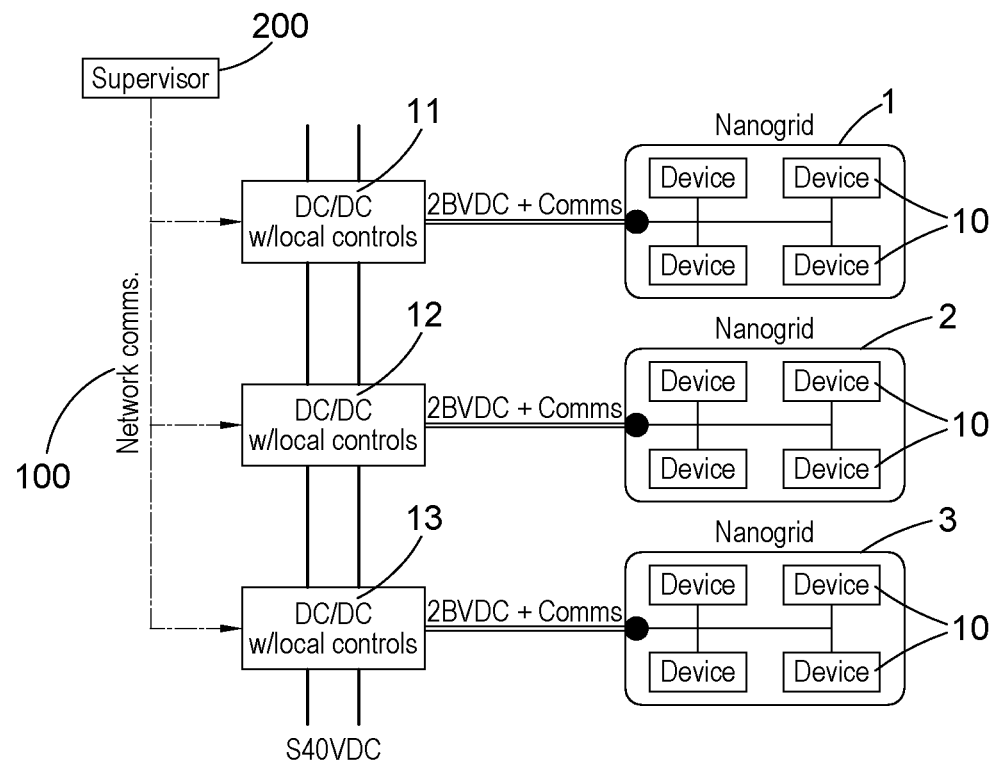
FIG. 1 shows an example of a PEMS system architecture in which the power management of the disclosure may be implemented.

The power and energy management scheme of this disclosure provides a generic process to implement generic PEMS logic for a network of heterogenous power devices 10 e.g. on-board an aircraft. To implement the scheme, in one example, as shown in FIG. 1, a generic supervisor 200 communicates, over a network 100 with local supervisors 11, 12, 13. The local supervisors 11, 12, 13 are each associated with one or more power devices 10, and are connected over the network 100 to the devices 10 to manage or adjust the power consumed by those devices depending on power demands on the network so as to, e.g. support the power network in the case of specific demand-related events e.g. overload conditions. In one example, devices may be grouped into device types or configurations or locations, each group forming its own nanogrid 1, 2, 3, with a local supervisor or local controller 11, 12, 13 associated with each such group 1, 2, 3. In the case of such groups, each local supervisor may 'see' the aggregate power consumption—i.e. the sum of the power consumed by all the devices in the group and/or may 'see' individual power consumption of each device.

Figure 2:
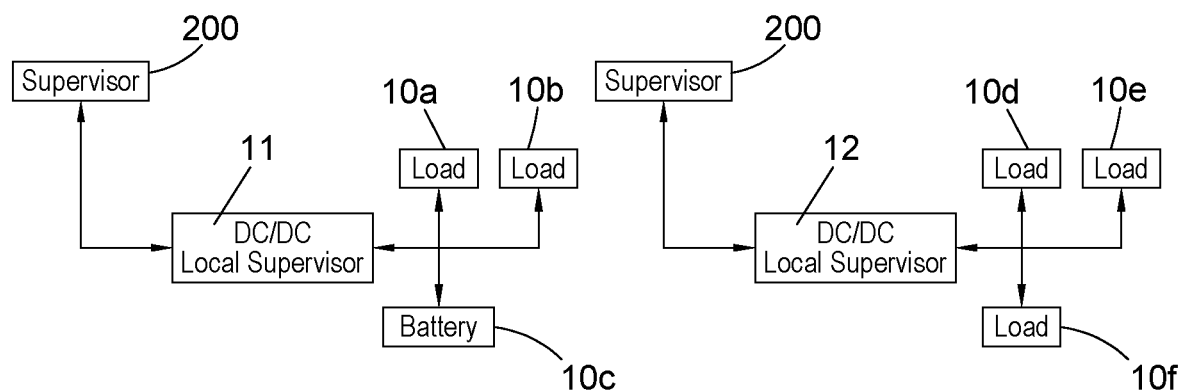
FIG. 2 shows how the power management may be applied to different power devices or combinations of power devices.

FIG. 2 shows two possible groupings by way of example only. It is clear that other groupings of devices (or even individual devices having their own individual local controller—i.e. the groups may have one or more devices) are possible. In the example shown, one group of devices includes two power loads 10a, 10b and one storage device—here a battery 10c, all controlled by a local supervisor 11 under the control of supervisor 200. The supervisor 200 can e.g. receive information from a flight management system, which can be used in the control. Another group of devices under the control of supervisor 200 may have three loads 10d, 10e, 10f under the control of a local supervisor 12.

Figure 3:
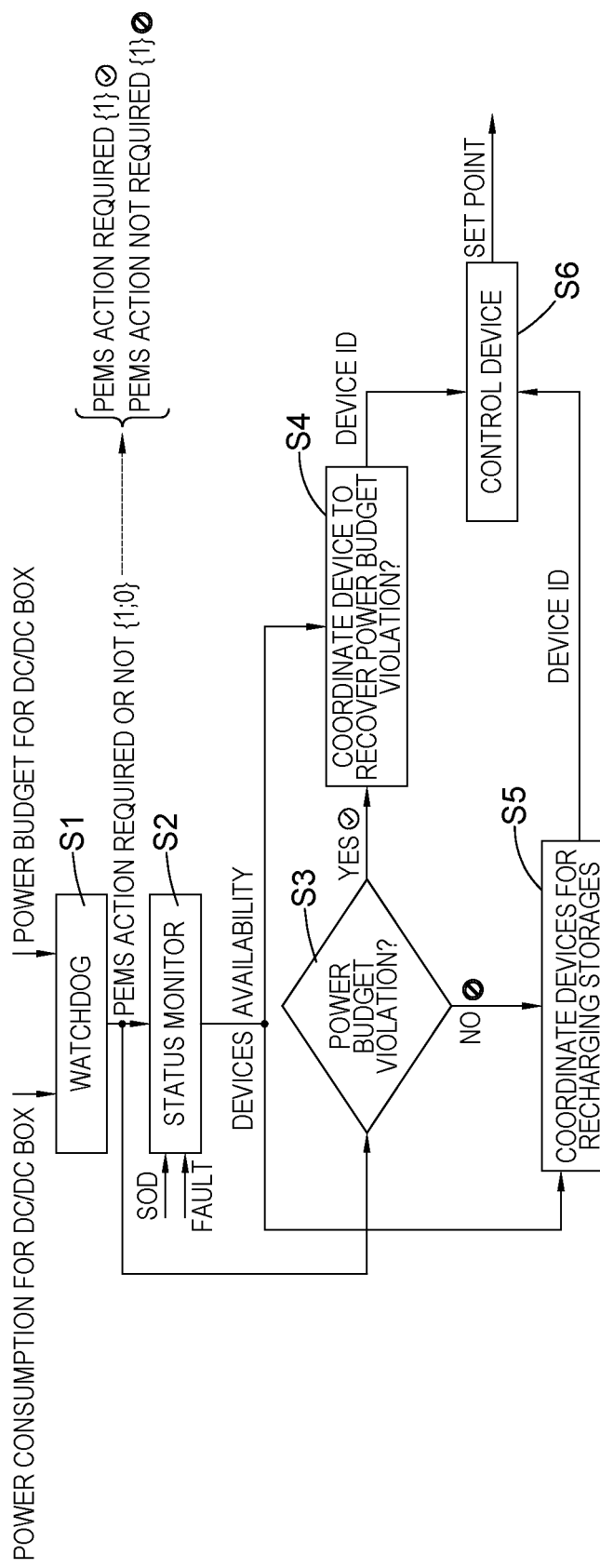
FIG. 3 is a flow chart shown power management according to an example of the disclosure.

The generic scheme provided by this disclosure can best be explained with reference to the example flow chart of FIG. 3.

In a first step S1, a determination is made as to whether the network conditions are such as to require management by the PEMS to restore desired (normal) operating conditions for the power devices on the network—i.e. a determination as to whether the power available (or. the power budget) and the power consumption of the devices on the network (i.e. the power demand) creates a mismatch e.g. an overload condition or a failure condition acting on the system, or some other condition requiring action by the PEMS. This determination may be performed by a 'watchdog' component of the system which watches over the whole network.

As a second step, S2, regardless of the determination in the first step, the availability status of the devices on the network, whether they be storage devices or flexible loads, is identified. In other words, the status of the devices on the network is monitored to determine their availability to contribute to the PEMS scheme. Information is obtained as to the status of the devices e.g. if they are operational or faulty/off. Faulty devices need to be identified, for example, because they cannot take part in the power management. This information is used later by the PEMS to identify suitable devices to be controlled to manage the power of the network and may be stored as a list of device status.

Based on the determination made in the first step, by the watchdog, as to whether the PEMS is required to act to redistribute or modify consumption by the individual devices e.g. to address an overload condition, or not, the scheme will follow one of two different branches.

If the watchdog, S1, has determined that the a power 'emergency' exists e.g. that available power on the network is exceeded by demand from the devices currently being powered on the network, or some other need for intervention by the PEMS, at S3, ('yes')—the system determines how to coordinate (e.g. in which order to operate) the devices that can participate in the PEM action at step S4 (taking into account the device status previously determined in step S2) to perform the required corrective actions to address the 'power emergency' condition identified at step S1. This will be described further below.

If, on the other hand, the watchdog determines that no intervention is required by the PEMS—i.e. there is currently no power 'emergency' at S3 ('no')—it is considered that the operating conditions of the power network may allow storage devices on the network e.g. batteries, supercapacitors etc. to be recharged with available power on the network. As part of this step, the PEMS may check whether there are storage devices on the network that need to be recharged and will manage the distribution of power to those devices in a coordinated manner at step S5 depending on e.g. the purpose of the storage devices, the amount of available energy and the power needed to charge them. The recharging process is performed by making sure that the process itself will not trigger other 'power emergency' conditions over the network (e.g. storage devices will only be recharged if the recharge does not violate the power budget).

Based on the decisions taken by the PEMS for power management in the previous steps, the final step of the scheme, S6, is to actually control the power devices, as determined by the PEMS, to modify their power consumption/to recharge. Of course, some power devices on the network may remain in their current state. The control of the devices is based on e.g. a device ID associated with each device. The control action performed at step S6 will change based on the decision taken at S3. In particular, at step S6, a control action will be performed to resolve the 'power emergency' condition acting on the network if the 'Yes' branch was followed at step S3, or will perform a recharging action of storage devices if, at step S3, the 'No' branch was taken.

Returning to the case in which the watchdog has identified a condition which requires management by the PEMS to support the power network, e.g. a power budget violation, as mentioned above, the PEMS will make a determination as to which devices should modify their power consumption and to what extent. In coordinating the power consumption between devices, step S4, the system will also use the status information from S2, since, e.g. faulty devices cannot fall within the management scheme. The determination may also take into account the nature of the devices e.g. whether or not they are safety critical and to what extent their power consumption can be adjusted. For example, some devices may only be able to be on or off, whereas others may be adjustable to operate in a lower power consumption mode (e.g. dimmer switches for lighting). Different devices or types of devices may have different priorities that will be taken into account in the PEMS coordination scheme—for example, in an overload condition, the passenger entertainment system might be switched off but the cabin lights kept on. The same concept is used at step S5—e.g. based on device availability, the PEMS determines which devices (e.g. storage devices) can be recharged based on their availability.

By providing a generic power and energy management scheme that can be used for all networks with different types of and combinations of power devices and storage devices, the scheme can be easily used in different applications, different aircraft etc. The steps of the generic scheme may be implemented using different logic and systems.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A power and energy management (PEM) method for managing power consumed by a plurality of power devices on a network, the PEM method comprising:
   a first network monitoring step (S1) to determine whether power and energy management is required based on the power available on the network and the power consumption of the power devices on the network;
   a status monitor step (S2) to determine the operating status of each of the power devices on the network;
   a step (S4) of determining a coordination strategy for operating the power devices on the network in response to a determination in the first network monitoring step that power energy management is required;
   a step (S5) of determining a coordination strategy for recharging of any storage devices on the network in response to a determination in the first network monitoring step that power energy management is not required, wherein the step (S5) of determining a coordination strategy for recharging of any storage devices includes determining if there are any storage devices on the network that need recharging and coordinating distribution of power to any storage devices determined as needing recharging based on the amount of available power and the power needed to recharge them; and
   controlling (S6) devices on the network to operate at a power consumption level and/or to recharge based on the above steps.

2. The PEM method of claim 1, wherein the plurality of devices comprise one or more groups of power devices.

3. The PEM method of claim 1, wherein the first network monitoring step (S1) determines whether power and energy management is required based on detection of an overcharge condition on the network.

4. The PEM method of claim 1, wherein the first network monitoring step (S1) determines whether power and energy management is required based on detection of a failure condition on the network.

5. The PEM method of claim 1, wherein the devices are controlled to operate at a set point based on the previous steps.

6. The PEM method of claim 1, wherein the operating status determined in the status monitoring step is stored in memory.

7. The PEM method of claim 1, wherein storage devices include batteries or supercapacitors.

8. The PEM method of claim 1, wherein the status monitoring step is performed regardless of the result of the first network monitoring step.

9. The PEM method of claim 1, wherein the status monitoring step obtains status information indicative of whether a power device is faulty or not available.

10. The PEM method of claim 1, for managing power consumed by a plurality of power devices on a network in an aircraft.

11. A power and energy management (PEM) system for performing the method of claim 1, the system comprising:
    a global supervisor;
    a plurality of local supervisors each connected for digital communication with one or more of the plurality of power devices, the local supervisors connected for communication with the global supervisor.

12. The PEM system of claim 11, wherein the plurality of power devices are power devices on an aircraft.

13. The PEM system of claim 11, wherein the power devices include devices whose power consumption can be adjusted.

* * * * *